(12) United States Patent
Fein et al.

(10) Patent No.: US 7,796,056 B2
(45) Date of Patent: Sep. 14, 2010

(54) DIGITAL WINDSHIELD INFORMATION SYSTEM EMPLOYING A RECOMMENDATION ENGINE KEYED TO A MAP DATABASE SYSTEM

(76) Inventors: Gene S. Fein, 760 East St., Lenox, MA (US) 01240; Edward Merritt, 139 Lime Kiln Rd., Lenox, MA (US) 01240

( * ) Notice: Subject to any disclaimer, the term of this patent is extended or adjusted under 35 U.S.C. 154(b) by 322 days.

(21) Appl. No.: 11/692,487

(22) Filed: Mar. 28, 2007

(65) Prior Publication Data
US 2008/0238723 A1 Oct. 2, 2008

(51) Int. Cl.
*G08G 1/123* (2006.01)
(52) U.S. Cl. ............ 340/995.24; 340/995.19; 340/995.1; 340/995.17; 340/995.26; 340/995.27
(58) Field of Classification Search ........ 340/995.19, 340/995.1, 995.17, 995.2, 995.21, 995.24, 340/995.26, 995.27
See application file for complete search history.

(56) References Cited

U.S. PATENT DOCUMENTS

| | | | |
|---|---|---|---|
| 7,466,244 B2* | 12/2008 | Kimchi et al. ........... | 340/995.1 |
| 2002/0138836 A1 | 9/2002 | Zimmerman | |
| 2004/0003398 A1 | 1/2004 | Donian et al. | |
| 2004/0021672 A1 | 2/2004 | Wada | |
| 2004/0139482 A1 | 7/2004 | Hale et al. | |
| 2005/0155070 A1 | 7/2005 | Slaughter | |
| 2006/0079214 A1 | 4/2006 | Mertama et al. | |
| 2006/0238379 A1* | 10/2006 | Kimchi et al. ........... | 340/995.1 |
| 2006/0238380 A1* | 10/2006 | Kimchi et al. ........... | 340/995.1 |
| 2006/0238381 A1* | 10/2006 | Kimchi et al. ........... | 340/995.1 |
| 2006/0238382 A1* | 10/2006 | Kimchi et al. ........... | 340/995.1 |
| 2006/0238383 A1* | 10/2006 | Kimchi et al. ........... | 340/995.1 |
| 2007/0091118 A1 | 4/2007 | Allen et al. | |
| 2007/0103341 A1* | 5/2007 | Kreiner et al. ............. | 340/988 |
| 2007/0210937 A1* | 9/2007 | Smith et al. ............. | 340/995.1 |
| 2007/0233380 A1* | 10/2007 | Tanaka .................... | 701/211 |
| 2007/0260604 A1 | 11/2007 | Haeuser et al. | |
| 2007/0273558 A1* | 11/2007 | Smith et al. ............. | 340/995.1 |
| 2008/0064490 A1 | 3/2008 | Ellis | |
| 2008/0066106 A1 | 3/2008 | Ellis et al. | |
| 2008/0120023 A1* | 5/2008 | Ofek ........................ | 701/207 |
| 2008/0201751 A1 | 8/2008 | Ahmed et al. | |
| 2009/0132441 A1 | 5/2009 | Muller et al. | |

FOREIGN PATENT DOCUMENTS

| | | |
|---|---|---|
| WO | 03043332 | 5/2003 |
| WO | 2004043069 | 5/2004 |
| WO | 2004105389 | 12/2004 |

OTHER PUBLICATIONS

International Search Report and Written Opinion of International Application No. PCT/US08/059806, dated Sep. 22, 2008.

* cited by examiner

*Primary Examiner*—Travis R Hunnings
(74) *Attorney, Agent, or Firm*—Stolowitz Ford Cowger LLP

(57) ABSTRACT

Disclosed is a method and system for recommending locations keyed to a map database system and providing navigation instructions to the recommended locations to a driver of a vehicle by gathering actual statistics about the preferences of the user and/or by comparing the user to population data to create recommendations in accord with the preferences of the population.

24 Claims, 16 Drawing Sheets though the system interface. Services, such as OnStar®, have made this practice increasingly popular among drivers and passengers by providing useful directions, recommendations about goods, food, entertainment and services and suggested maintenance. Windshield display systems have functioned solely for directional, gauge monitoring, maintenance info and warning systems related to external and internal conditions.

DIGITAL WINDSHIELD INFORMATION SYSTEM EMPLOYING A RECOMMENDATION ENGINE KEYED TO A MAP DATABASE SYSTEM

BACKGROUND OF THE INVENTION

It is well known that windshield lighting systems on airplanes and superimposed over pilot helmet masks can give illuminated cues as to conditions that the pilot or co-pilot should be aware of. These systems may also be translated to an automobile windshield to give the same sort of information, safety and car maintenance information to a driver. It is also well known that Global Positioning Satellite (GPS) and computer based systems now exist on vehicles to pass information beyond immediate, navigational and maintenance information onto drivers and passengers alike.

Currently, the use of GPS and in-vehicle recommendation systems use voice activation or mounted screen on the dashboard to display useful information about goods, services and directions. Certain services also hold a user's favorite selections and history to make them easily accessible to the user via the system interface. Services, such as OnStar®, have made this practice increasingly popular among drivers and passengers by providing useful directions, recommendations about goods, food, entertainment and services and suggested maintenance. Windshield display systems have functioned solely for directional, gauge monitoring, maintenance info and warning systems related to external and internal conditions.

Conventional models address the windshield system and the recommendation elements of services such as the OnStar®; system separately. The two elements do not merge in any current deployments in the marketplace. Vehicle recommendation systems use history and preferences input by the user to generate recommendations, but those recommendations are communicated to the user only when the user requests the recommendations. There is no implied preference or collaborative filtering utilized to generate additional recommendations based upon trends of the user or a relatable community of data to the user's data. As stated previously, recommendation systems such as OnStar® and the windshield guidance and warning system displays have not merged in the field. Conventional models of the windshield system utilize data and sensors, which may also appear on the dashboard, to provide the driver and or co-pilot with data fed through the sensor and gauge system to a microprocessor which transmits the corresponding data to lighted displays deployed on or within the windshield glass. These displays are coded to represent the data obtained by the gauges and sensors in useful ways to the driver/pilot and or co-pilot.

Unfortunately, the existing conventional uses have certain limitations in distribution and deployment. First of all, the OnStar® systems and the windshield interface communications systems run in completely separate formats and are not integrated to display non-critical driving information upon the windshield. Secondly, the display of OnStar® type recommendations and preferences does not provide a collaborative filtering or advanced data analysis tool utilizing research trend information to generate additional recommendation for the user to generate additional information which could be deployed upon the windshield interface system.

Accordingly, there is a need for an integrated system that combines all functions of the windshield warning system with all functions of the OnStar® driver navigation, assistance and recommendation systems. Additionally, the OnStar® style system needs to integrate user recommendations based upon external data and fuse that service into the windshield interface deployment. Further, updated sensor and lighting technology need to be integrated into the windshield system to maximize the effectiveness and durability of the windshield interface system.

SUMMARY OF THE INVENTION

The present invention relates to the creation of a windshield visual and audio system that reflects safety instructions, GPS data of interest and the utilization of input and learned data to create real time alerts and recommendations for the user.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

The present invention, in accordance with one embodiment relates to the creation of a windshield-displayed guidance system 10 that incorporates safety, guidance and GPS information along with recommendations for the vehicle specific populations based upon user input, history, research and collaborative filtering techniques. The system 10 may be automated, voice activated or controlled by a switch that is installed in the vehicle or as an external add-on or wireless control. The system 10 also allows for the operator(s) to initiate contact with parties outside the vehicle based upon operator command or system recommendation.

Figure 1:
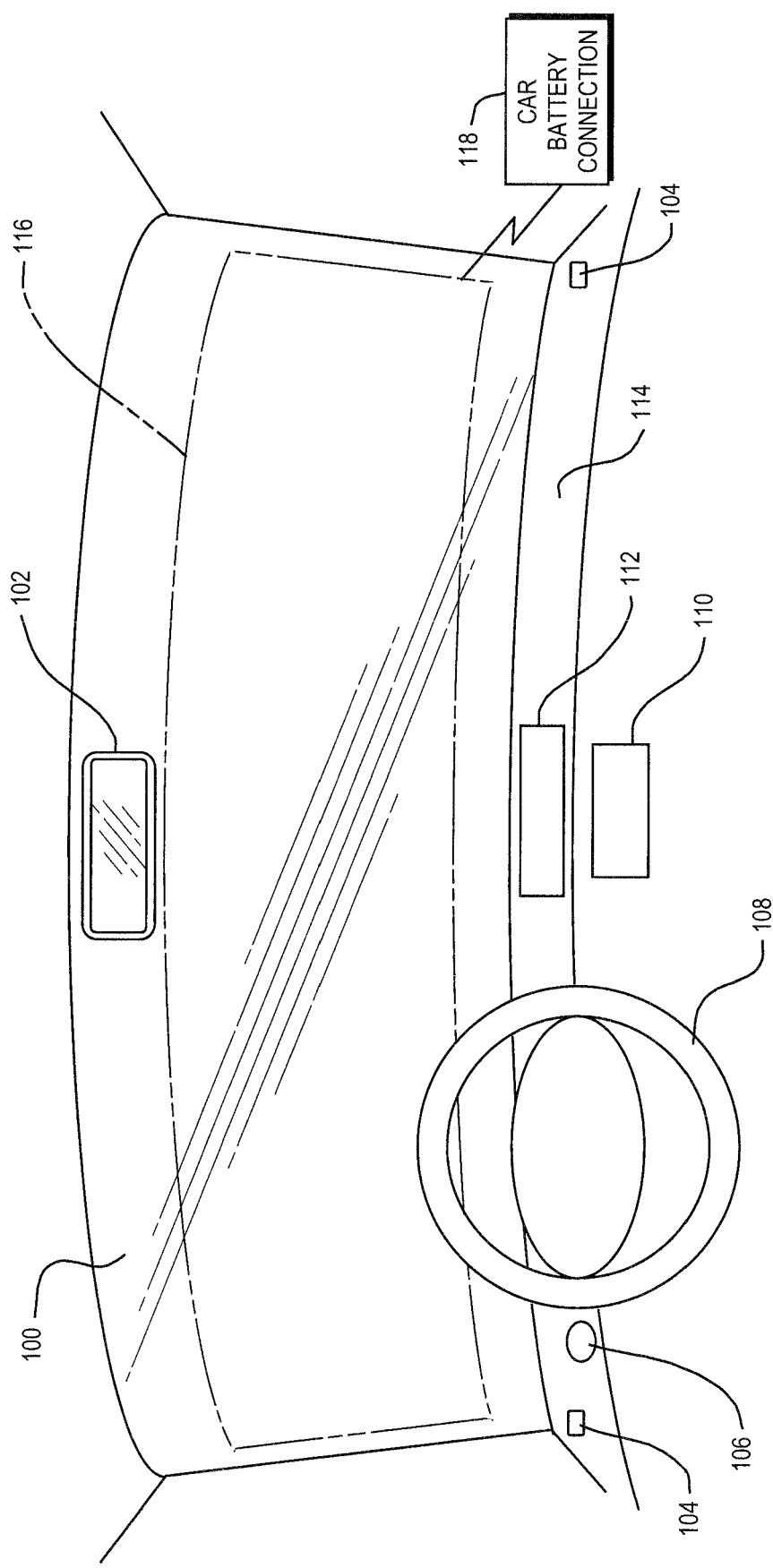
FIG. 1 illustrates the components of an exemplary system of the present invention.

FIG. 1 illustrates one embodiment of the present invention. FIG. 1 illustrates the typical environment in the front seat of an automobile, including a windshield 100, rear view mirror 102, steering wheel 108, and dashboard 114. The embodiment illustrated in FIG. 1 includes a GPS 110, a control panel 112, speakers 104, a voice activation microphone 106, and a system display area 116 located at the windshield.

The system display area 116 may be formed in several ways. The system display area 116 may be formed of transparent and organic light-emitting diodes (OLED) formed on the windshield 100 or projected from the dashboard 114 onto the windshield 100. The system display area 116 may alternatively be formed by a fiber optic lighting display screen embedded in the windshield or projected from the dashboard onto the windshield. The system display area 116 may receive power from the car battery 118 or from an alternative power source (not shown) such as hand crank, solar power, wind power, or regenerative braking.

The hardware of the system 10 utilizes either a hardwired relay from a CPU into the dashboard 114 or utilizes tiny wireless transmitters embedded in, or on the external or internal surface of the windshield 100 in tandem with the lighting system. The system 10 illuminates either color coded lights or lighted messages in text or graphical symbols based upon information transferred from the CPU and software logic stored in the memory and hard drive or storage area of the system 10. The illuminated LED lights are powered to light by the system 10 in a logical method based upon the words or lighted advisory to be deployed. The lighted LED lights reside in a grid that makes it possible for all messages or coded advisories to be lighted in the appropriate color based upon the installed grid of lights in the windshield 100. This data may be immediately transferred upon receipt from an external sensor, internet, virtual private network, wireless internet or local vehicle information or other similar system data.

Figure 2:
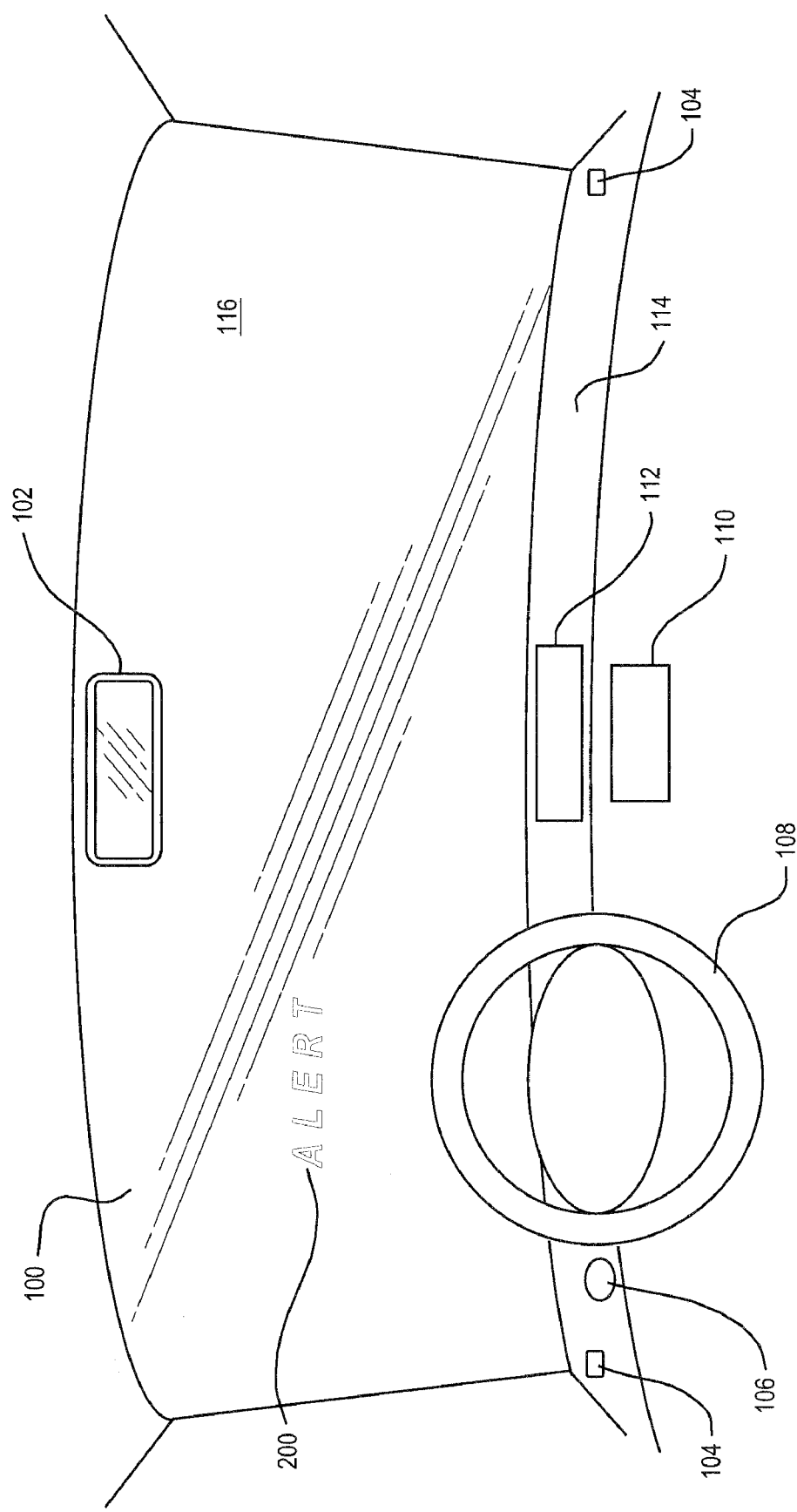
FIG. 2 illustrates the display of an alert on the exemplary system of FIG. 1.
Figure 3:
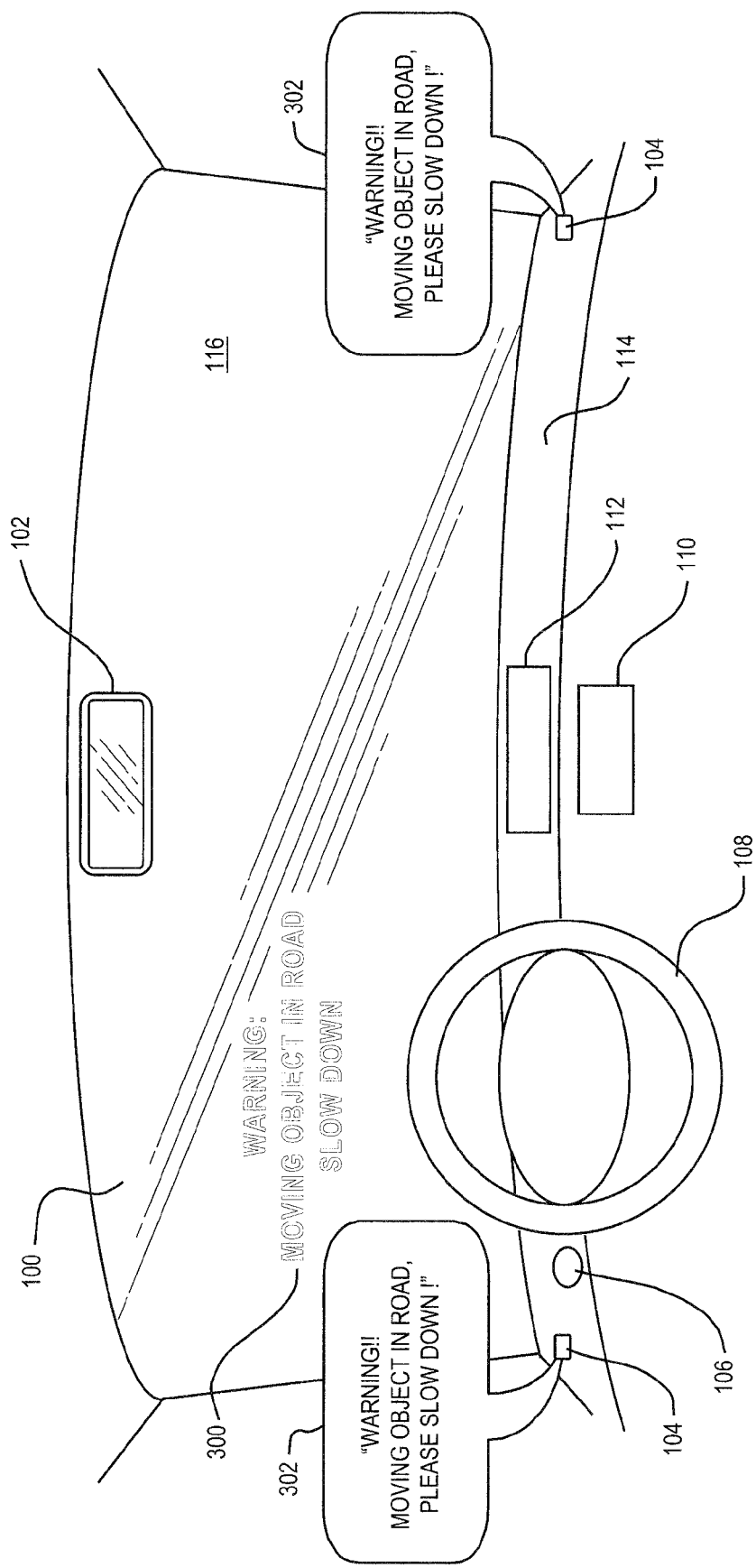
FIG. 3 illustrates the display of a warning related to a road hazard on the exemplary system of FIG. 1.
Figure 4:
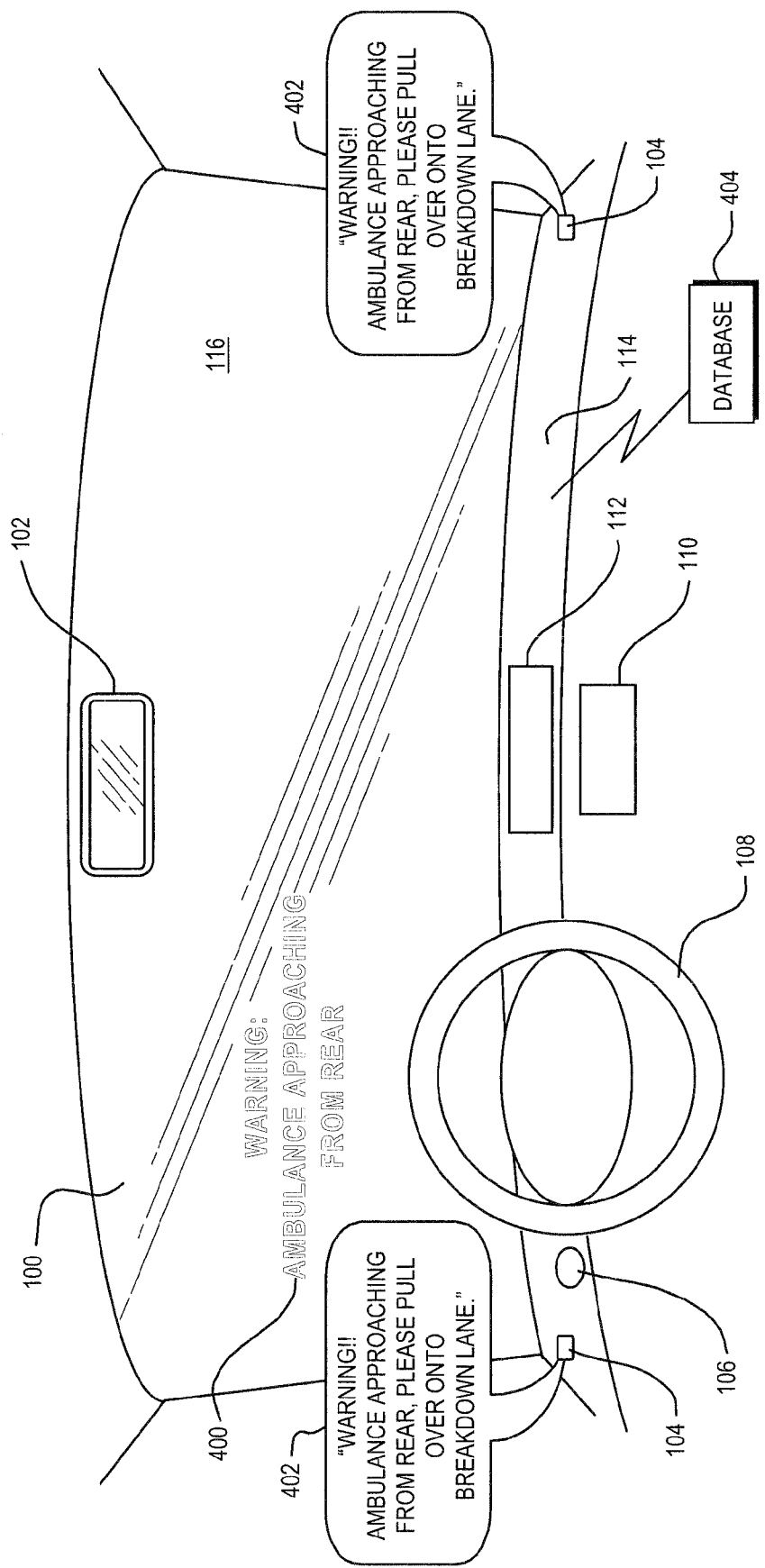
FIG. 4 illustrates the display of a warning related to an approaching emergency vehicle on the exemplary system of FIG. 1.
Figure 5:
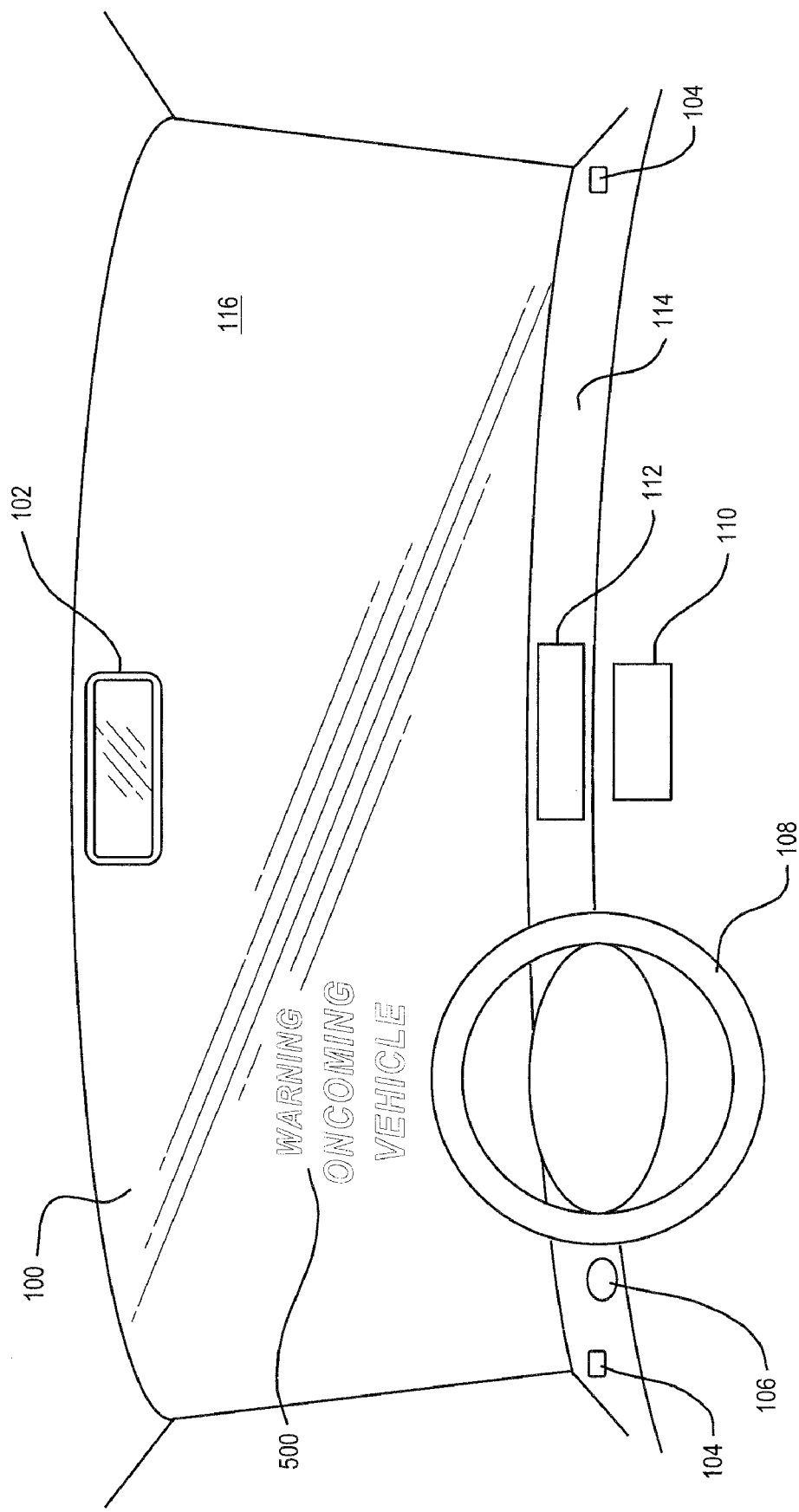
FIG. 5 illustrates the display of a warning related to an oncoming vehicle on the exemplary system of FIG. 1.
Figure 6:
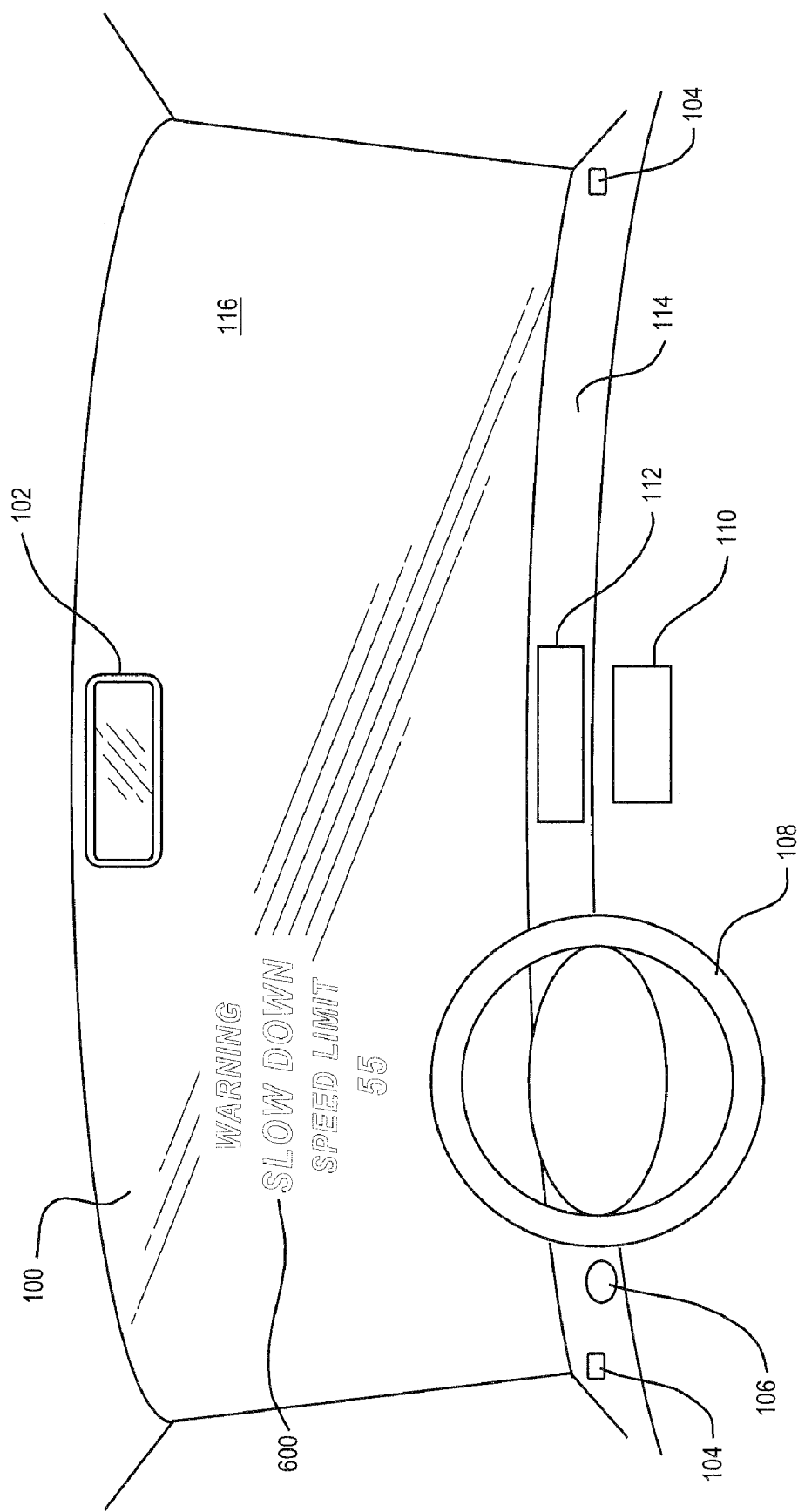
FIG. 6 illustrates the display of a warning to slow down and a display of the speed limit on the exemplary system of FIG. 1.
Figure 7:
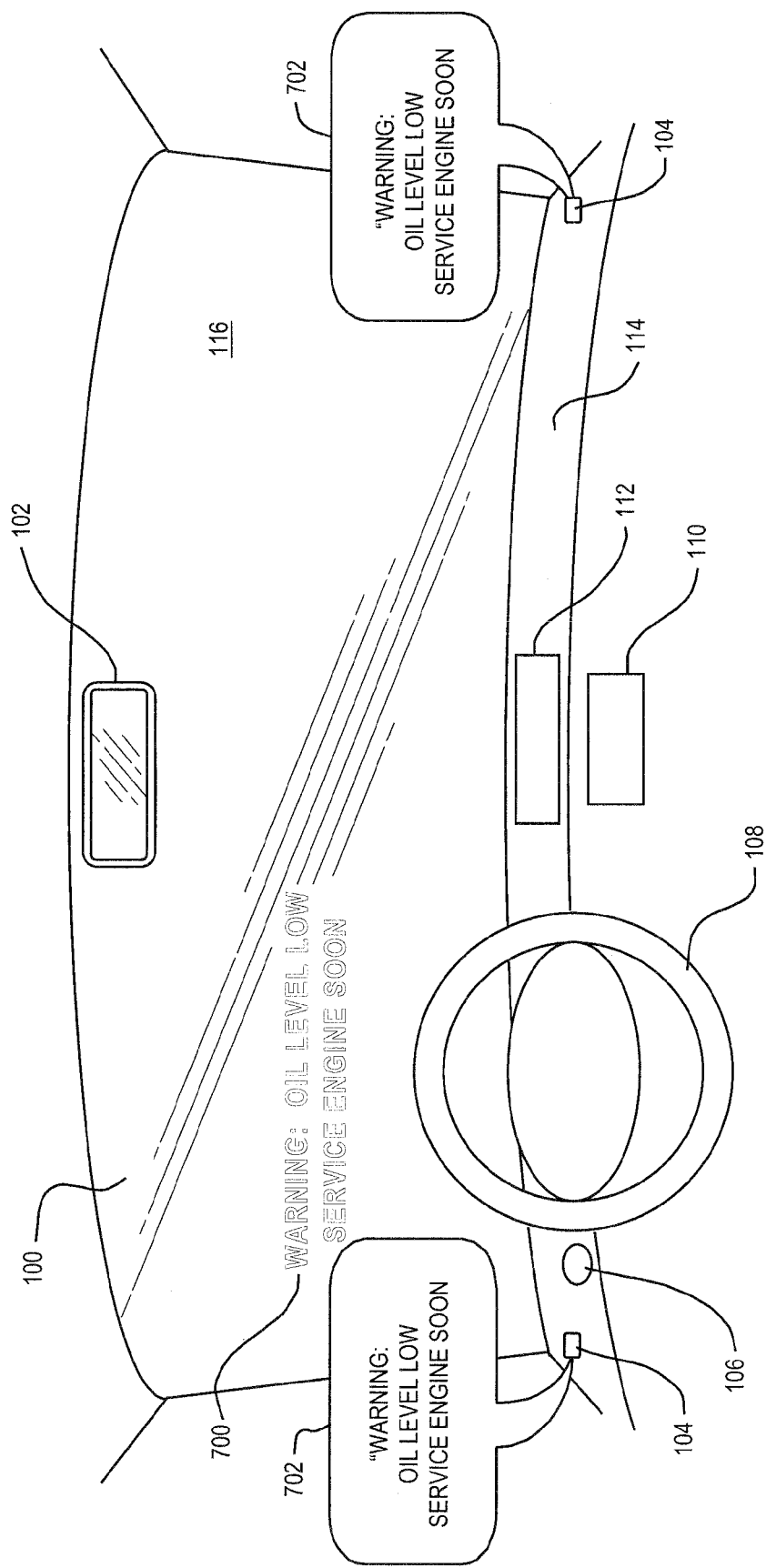
FIG. 7 illustrates the display of a warning related to the running condition or operational state of the vehicle on the exemplary system of FIG. 1.
Figure 8:
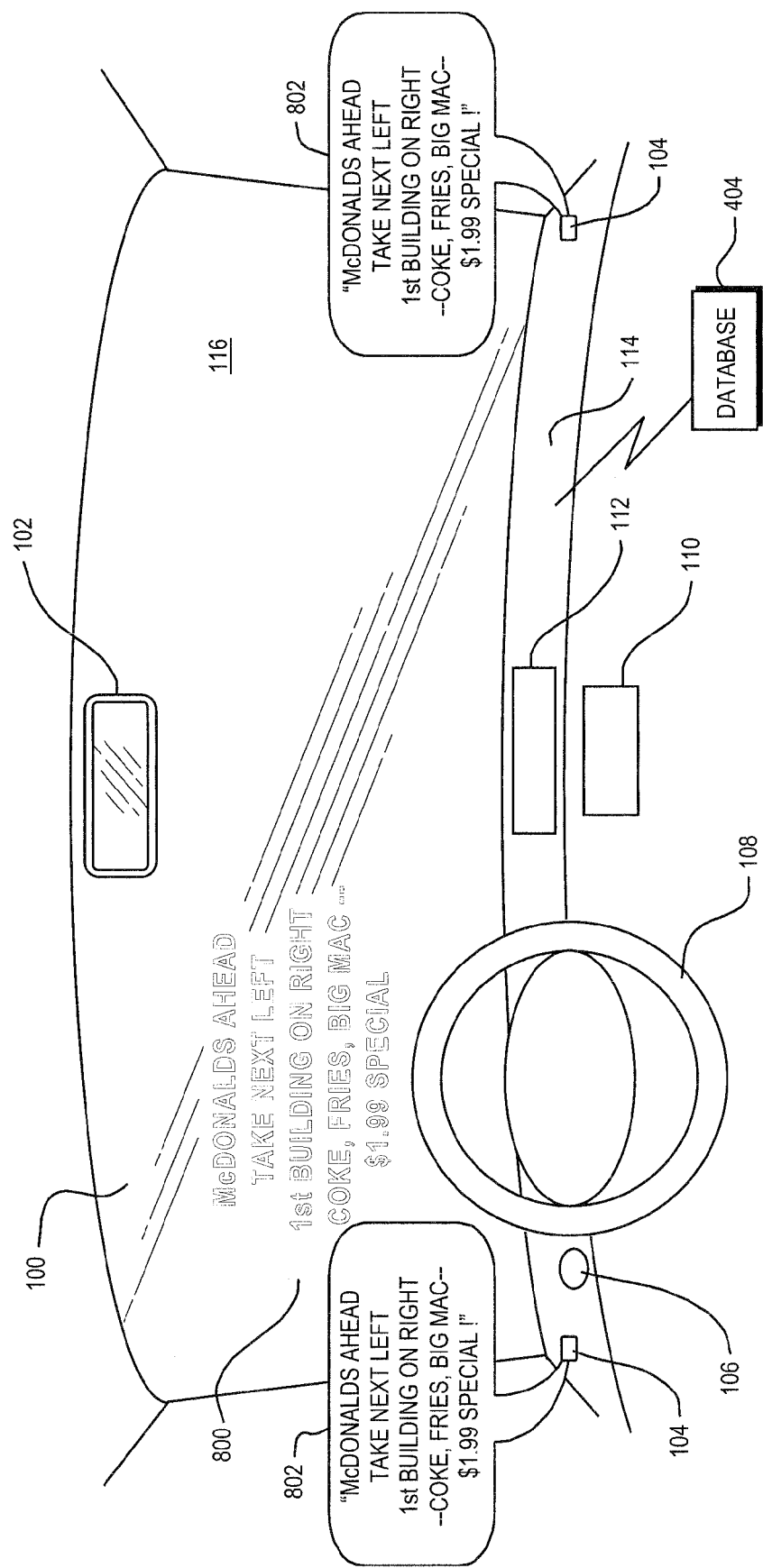
FIG. 8 illustrates the display of directions and advertising related to a business on the exemplary system of FIG. 1.
Figure 9:
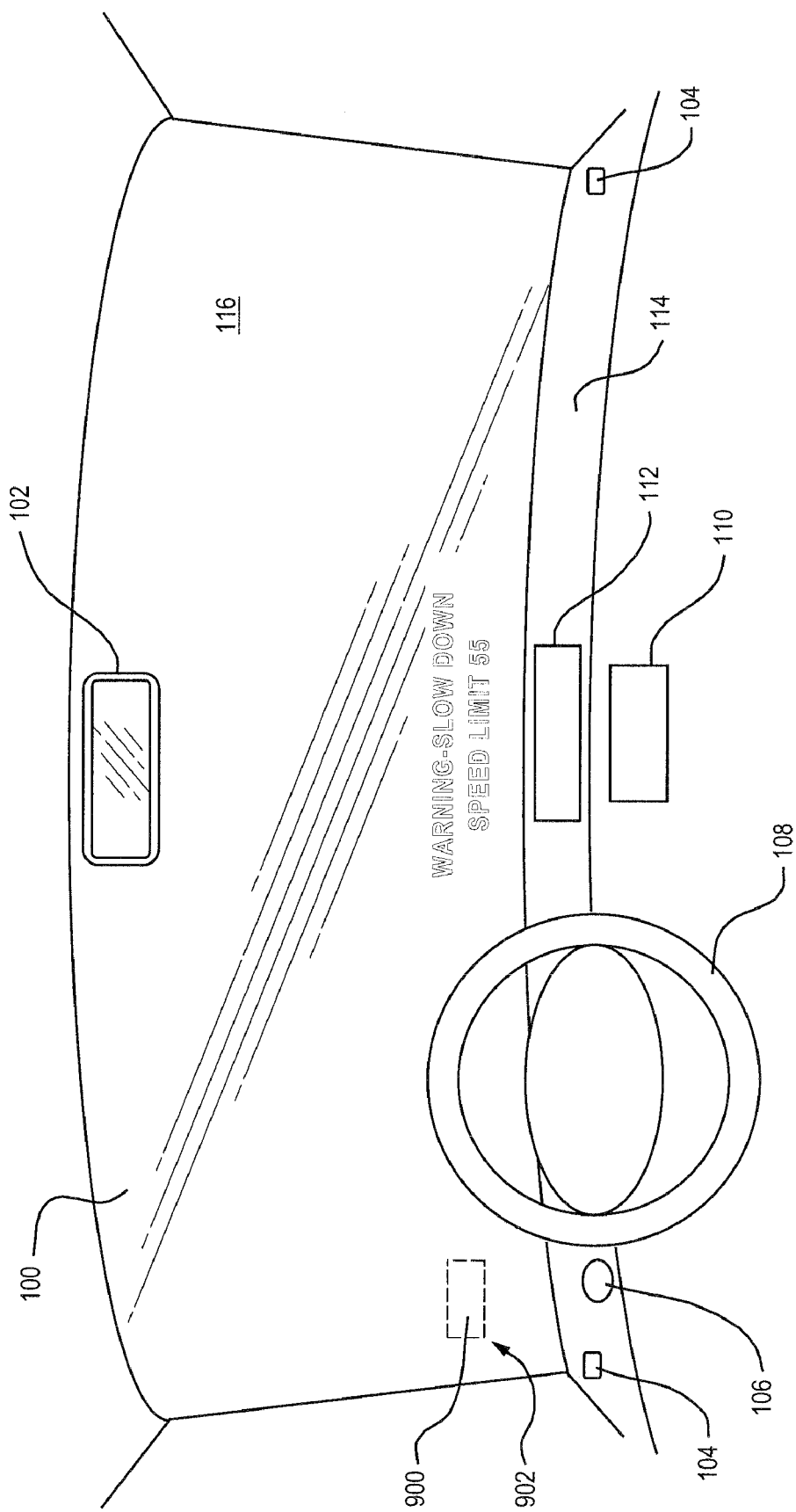
FIG. 9 illustrates the display of a general warning indicator that prompts the driver to seek further information.

FIGS. 2 through 9 illustrate various exemplary embodiments of messages that may be provided to a driver through the system display area 116 and the speakers 104. FIG. 2 shows a general alert 200 on the system display area 116, which may be accompanied by more detailed information via the speakers 104. FIG. 3 illustrates a more specific warning related to a detected object in the road and an advisory to slow down 300 on the system display area 116 and an accompanying message being broadcast via the speakers 104. The display of FIG. 3 uses sensors 1000—described below— located on the vehicle 1002 to detect the object or road hazard in the path of the vehicle. FIG. 4 illustrates another embodiment in which the system display area 116 and speakers 104 provide a visual warning 400 and an audio warning 402 regarding an approaching emergency vehicle and an advisory to move to the side of the road. The display of FIG. 4 uses sensors 1000—described below—located on the vehicle 1002 to detect the presence of the emergency vehicle. FIG. 5 illustrates an embodiment in which the system display area 116 provides a warning about approaching traffic 500. The display of FIG. 5 uses sensors 1000—described below— located on the vehicle 1002 to detect the oncoming vehicle. FIG. 6 illustrates a warning related to excessive speed 600 on the system display area 116. The visual warning 600 may be accompanied by an audio warning from the speakers 104. The warning illustrated in FIG. 6 could either be triggered by sensors 1000—described below—located on the vehicle 1002 or by the GPS 110 referencing map data related to speed limits for the roadway. FIG. 7 illustrates a warning 700 related to the operating condition of the automobile displayed on the system display area 1116 and also provided in audio form (warning message 702) via the speakers 104. FIG. 8 illustrates the presentation of directions to a place and an advertisement for the place 800, 802 on the system display area 116 and speakers 104 respectively. The advertisement 800, 802 alternatively could provide only the advertisement or only the directions to the location. FIG. 9 illustrates the presentation of a generalized alert 900 in the lower corner of the windshield 100 that prompts the driver to get further information. The generalized alert 900 can be varied by color, intensity, or by flashing on and off at different rates. For example, an important alert, such as an upcoming sudden stop in traffic, may result in a red alert prompt 900 being placed on the windshield 100. On the other hand, a green alert prompt 900 being placed on the windshield 100 may result when the system is recommending a "leister" location (e.g., McDonalds®) to the driver.

The data that is relayed to the windshield arrives from different sources with different priorities. For example in one embodiment immediate safety issues are displayed before maintenance issues which are displayed before vehicle directions (unless an immediate action is needed), which are displayed before system recommendations.

Figure 10:
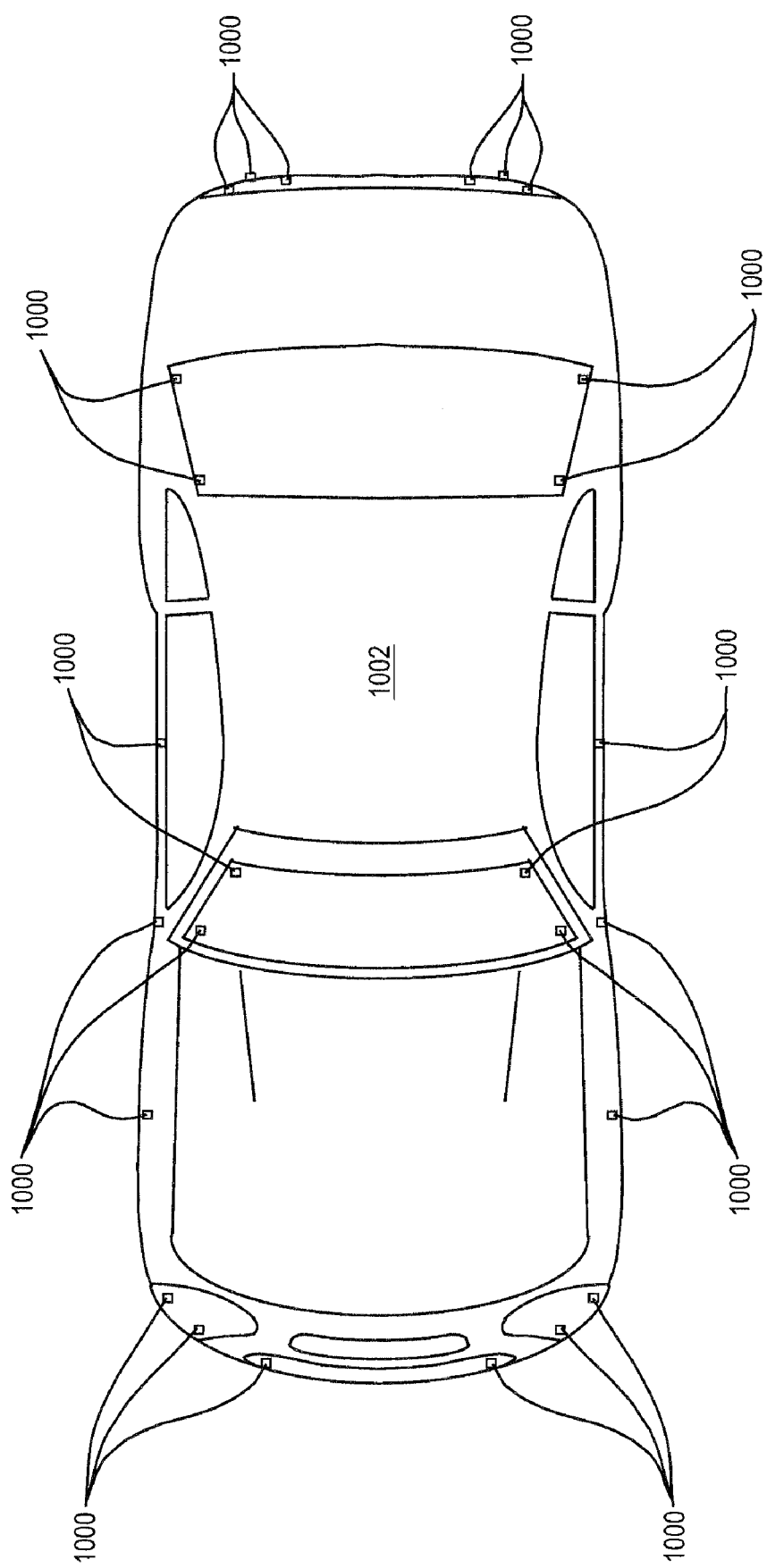
FIG. 10 illustrates a possible positioning of sensors on a vehicle to be coupled to the exemplary system of FIG. 1.

FIG. 10 illustrates one possible way in which sensors 1000 (such as standard sensors or the new IEEE 1451.4 sensors that offer a standard interface and protocol by which a sensor can describe itself over a network) provide information on road traffic and road hazards. This makes the sensor not only a calibrated gauge or reader of information but also a part of the communication pipeline that enables a wireless infrastructure to be implemented without local components for communication or function in a wired infrastructure with fewer components to be implemented.

Safety information, such as road hazards, information on other vehicles, or icy conditions, are transferred from the sensors 1000 to the CPU. In the CPU, the sensor data is processed and sent to the invention program 10 to determine if the sensor data merits a warning to the driver. Other safety information can be filtered into the invention system 10 from GPS 110, the internet (a global computer network) or via satellite including road conditions, local, regional, specific destination, national or global safety warnings depending on the system settings and thresholds. Destination directions can also be sent to the vehicle via global computer network (e.g. the internet), GPS or other wireless communication system. The invention system 10 can provide directions in accord with the driver's request, and in cases where the driver has not requested directions, destinations that the user frequently travels to that are matched up by the system because of the route the user is traveling may be presented to the user, by the system 10, as destination options along the way.

Figure 11:
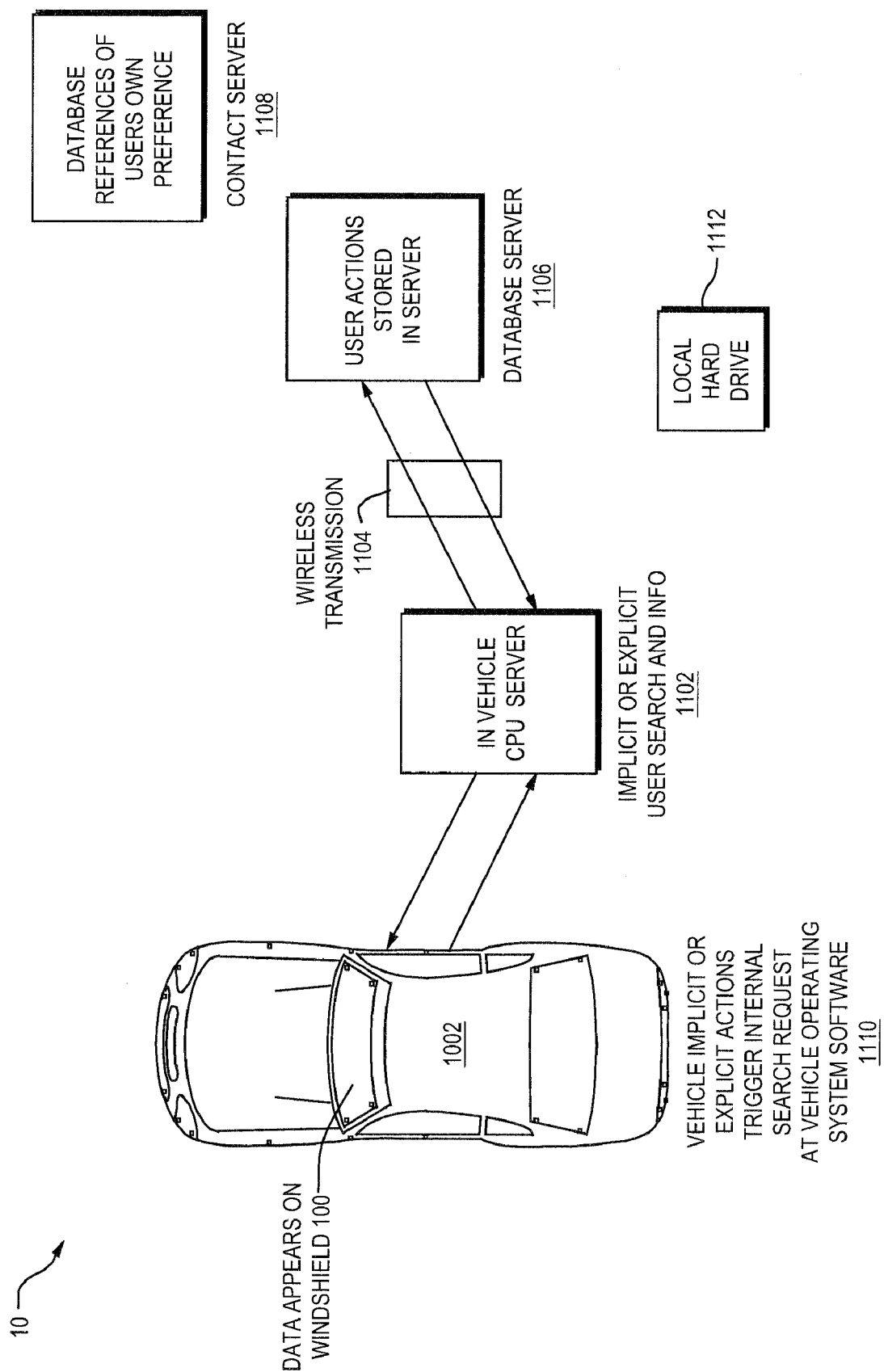
FIG. 11 is a block diagram of a recommendation model of the present invention based on user actions.

Recommendation programming software enhances the invention system 10 function in a variety of ways. Recommendations can be based upon direct user requests 1102 (FIG. 11) that are input into the system by the user which identifies both the user's specific favorite locations, such as Regina's Pizzeria on Thatcher Street in Boston and Maxie's Art Gallery, as well as category favorites, such as seafood restaurants and art galleries. The system 10 is built upon a four pronged recommendation engine in a preferred embodiment.

The first prong is based upon user requests 1102 that are stored and accounted for by the system 10 in accordance with driver-requested locations and the time of the requests. This data is stored on a hard drive 1112 of the system 10 or can be stored in an ancillary remote server 1106, accessible via wireless transmission 1104, called upon by the system 10. This data is then configured with the database programming software rules, which are custom programming rules dedicated to presenting the user with the content they want, at the time the user wants it, without the user having to ask for the content before it is displayed. Driver location requests are logged via a tagging system to note in the recommendation database 1108 what content is requested by the user at what time. After some number of requests, the driver's request habits become recommendations. For example, if a user requests directions to the nearest McDonalds® between 7-7:30 AM, or simply visits a McDonalds®, three times in a row during the week, then under a database rule, a request made more than three times could become a recommendation default setting. The user request model could use any number of repeated requests to trigger the creation of a recommendation default setting. The recommendation program then queues the software to find the nearest McDonalds® every morning at 7 AM. By using a user's behavior as a primary source, the invention system 10 begins to automatically recommend destinations to the user.

The second prong is based on alternate user data obtained by user consent, such as credit card bills that describe user patterns, demographic information supplied by the driver (user), questionnaire(s) filled out by the user, data and cookies that may be used to glean, update, and store the user's online usage patterns. For example, if the driver purchases McDonalds® coffee every morning with a credit card at 7:00 AM, the invention system 10 may recommend a nearby coffee retailer location to the user at 7 AM based on the authorized credit card data.

Figure 12:
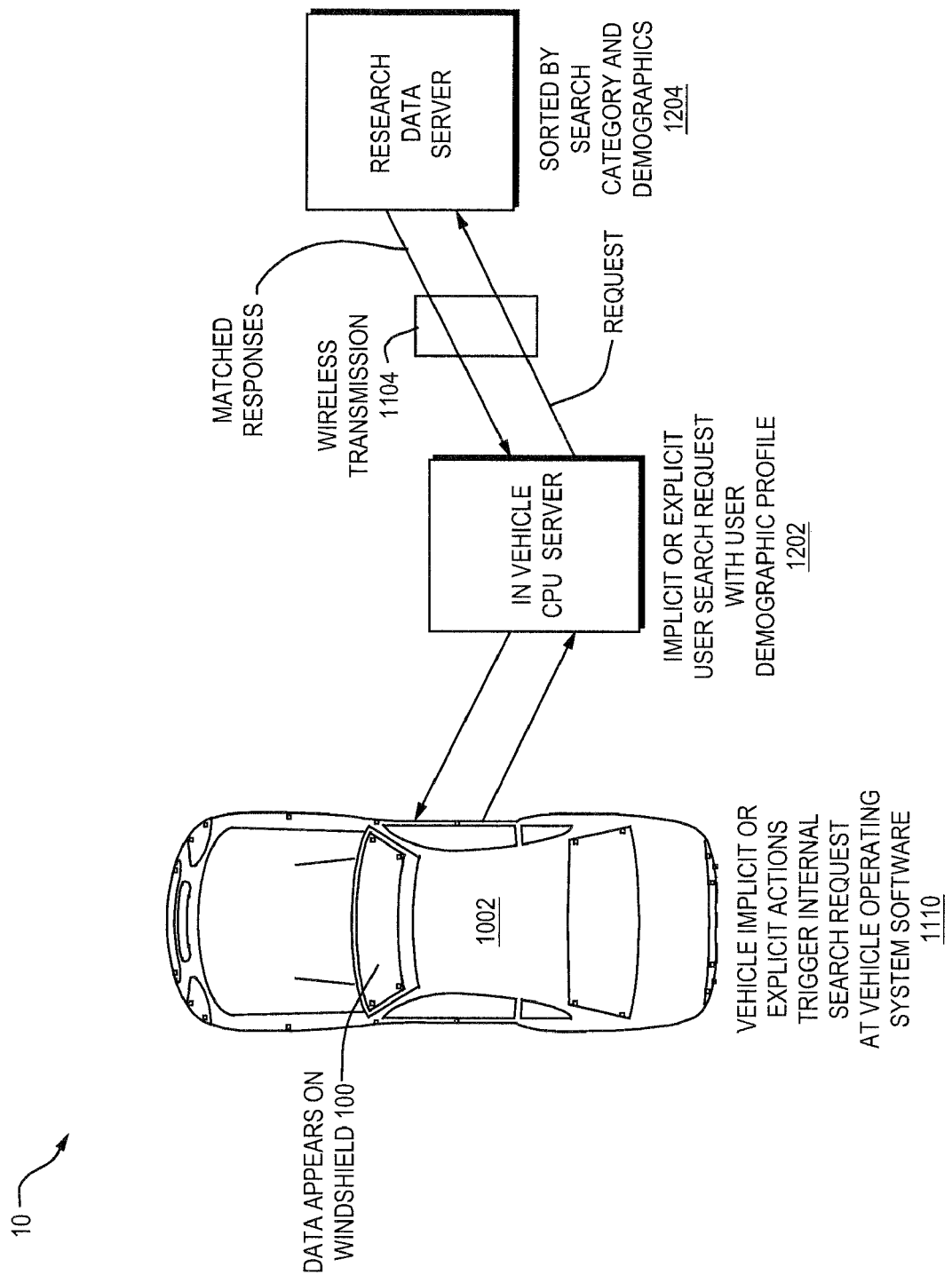
FIG. 12 is a block diagram of a recommendation model of the present invention based on research data.

The third prong uses research data to infer the driver's preferences, (i.e., a user likes restaurant A; research shows that people who like restaurant A also like restaurant B, so the invention system 10 recommends restaurant B to the user). Based upon research model recommendation engines, a sample of driver data is utilized to generate location matches in the system 10 based upon the research of industry professionals. This is a server based platform 1204 (FIG. 12) that may be updated based upon new content being made available to the overall system 10. This content may be searchable by the vehicle system 10 via wireless transmission 1104.

Figure 13:
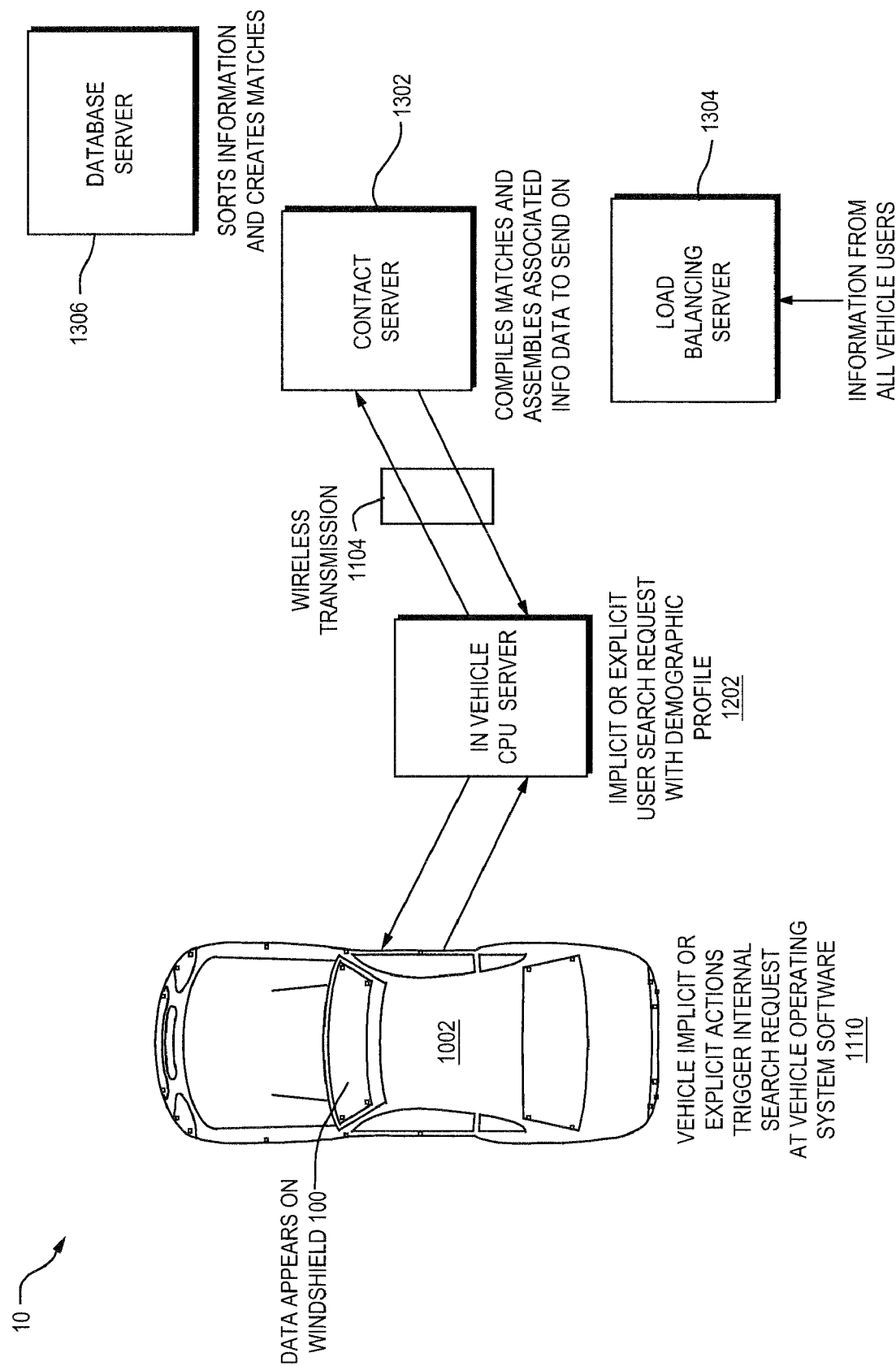
FIG. 13 is a block diagram of a recommendation model of the present invention based on collaborative filtering.

The fourth prong uses collaborative filtering where drivers using the same service may permit their data to be anonymously gathered in a central database to infer the driver's preferences. This system harnesses anonymous user demographics and location information stored on one set of hard drives 1302 (FIG. 13 such as a multi-terabyte raid array. Another set of load balancing servers 1304 queues incoming and outgoing queries to the system 10. A third set of servers 1306 assigns and matches drivers and queries and assigns location recommendations based upon theories of collaborative filtering for users with a certain number of content matches, such as a 25% overall content match rate, as logged in the database 1306 between each other from projector system 10 use. Resultant locations are then recommended to the driver-user by the collaborative filtering software. This is accomplished by a programming engine presenting location recommendations that the user does not have in his list of requested content 1108 within the system 10 from another user's list of preferred locations based upon their usage of the projector system 10. For example, if a driver has repeatedly requested directions to McDonalds® where he orders coffee, then collaborative filtering may show that other individuals in the database 1306 (i.e., collaborators) who like McDonalds® coffee also tend to like shopping for clothing at The Gap®. As a result, the system 10 may recommend The Gap® to the driver. Before presenting the driver-user with a match, the system 10 scans available locations to make sure that the match is available.

While the four prongs of the recommendation engine have been described separately, several prongs may be used concurrently to offer recommendations to the user. For example, locations the user has requested or visited (the first prong) and purchasing habits of the user (the second prong) may be combined to provide data to a collaborative filtering model (the fourth prong). Furthermore, the recommendation engine may cycle through each of the four prongs.

Figure 16:
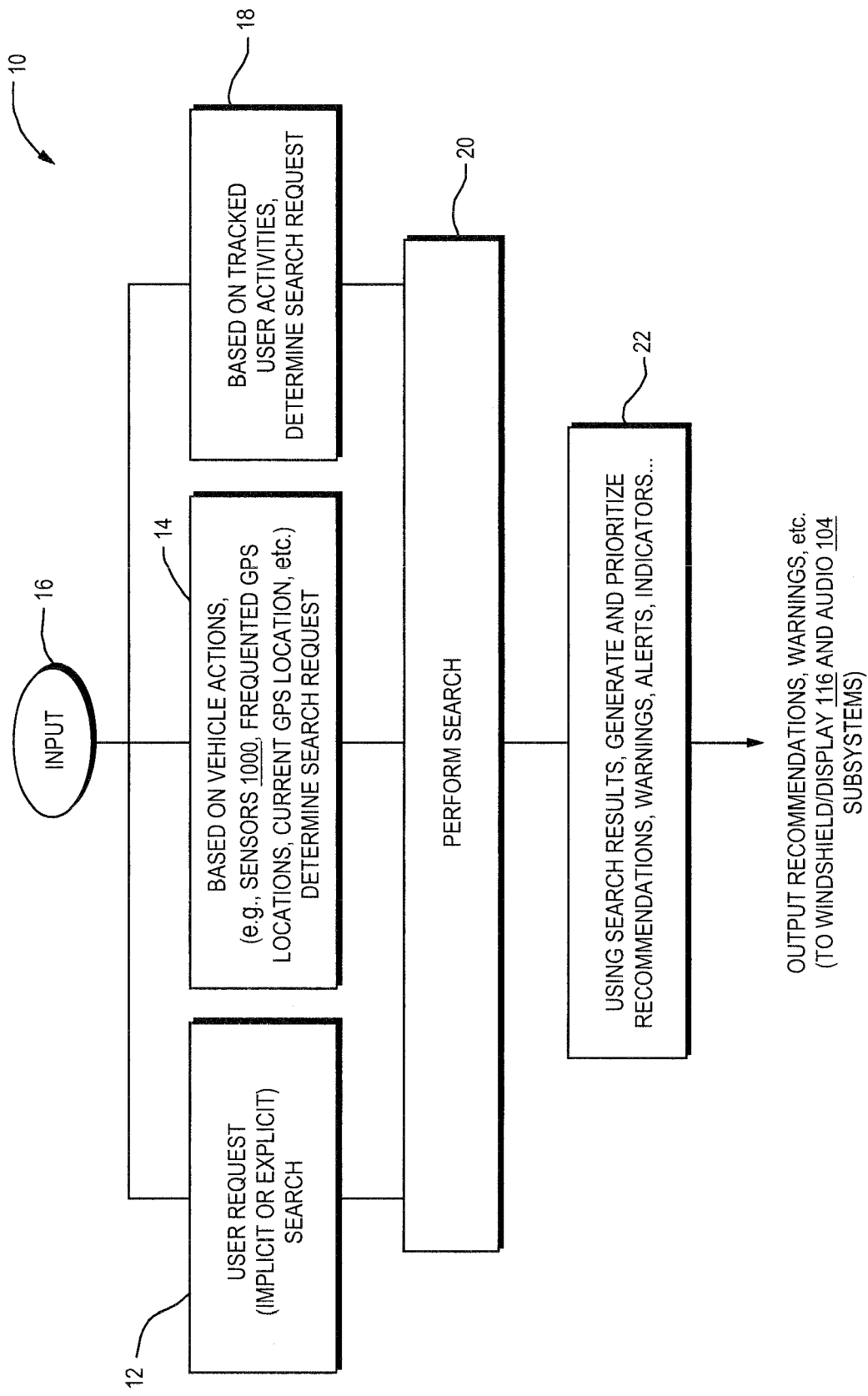
FIG. 16 is a flow diagram of one embodiment.

FIG. 16 illustrates one operating system or processor program 10 embodying the present invention and implementing the foregoing features. Input 16 includes sensor data (object motion, detected audio, detected hazards, etc.) from sensors 1000, user data (search request pattern, demographic profile, shopping/purchasing patterns, preferences) 1102, 1202 which is input explicitly or implicitly by the user, and GPS 110 location data (from a supporting map database). The combination of GPS 110 data and sensor 1000 data form vehicle implicit or explicit actions that trigger certain search requests as shown at 1110 in FIGS. 11-13 discussed above and at step 14 in FIG. 16.

From input 16, invention system 10 determines (at step 12) a user requested search as explicitly input (e.g. via voice activation microphone 106) by the user and/or as implicitly formed by system 10 tracking user requests and driving/location patterns over time and determining patterns to search. At step 18, system 10 determines search requests based on other user activity and information collected such as described above in the second through fourth prongs of the recommendation engine of FIGS. 11-13.

Next, at step 20, invention system 10 performs the determined search requests from Steps 12, 14, and 18 using database servers 1108, 1204, 1302 and 1306 described above. From the results of searches by step 20, step 22 generates and prioritizes warnings, alerts, related indicators, and/or recommendations which are output in a manner suitable for rendering on windshield display area 116 and/or through speakers 104 as described above in FIGS. 1-9. The output recommendations include details of recommended locations such as:

geographic information sufficient to provide driving directions;

a respective telephone number per location;

logos related to the locations; and events related to the locations.

Figure 14:
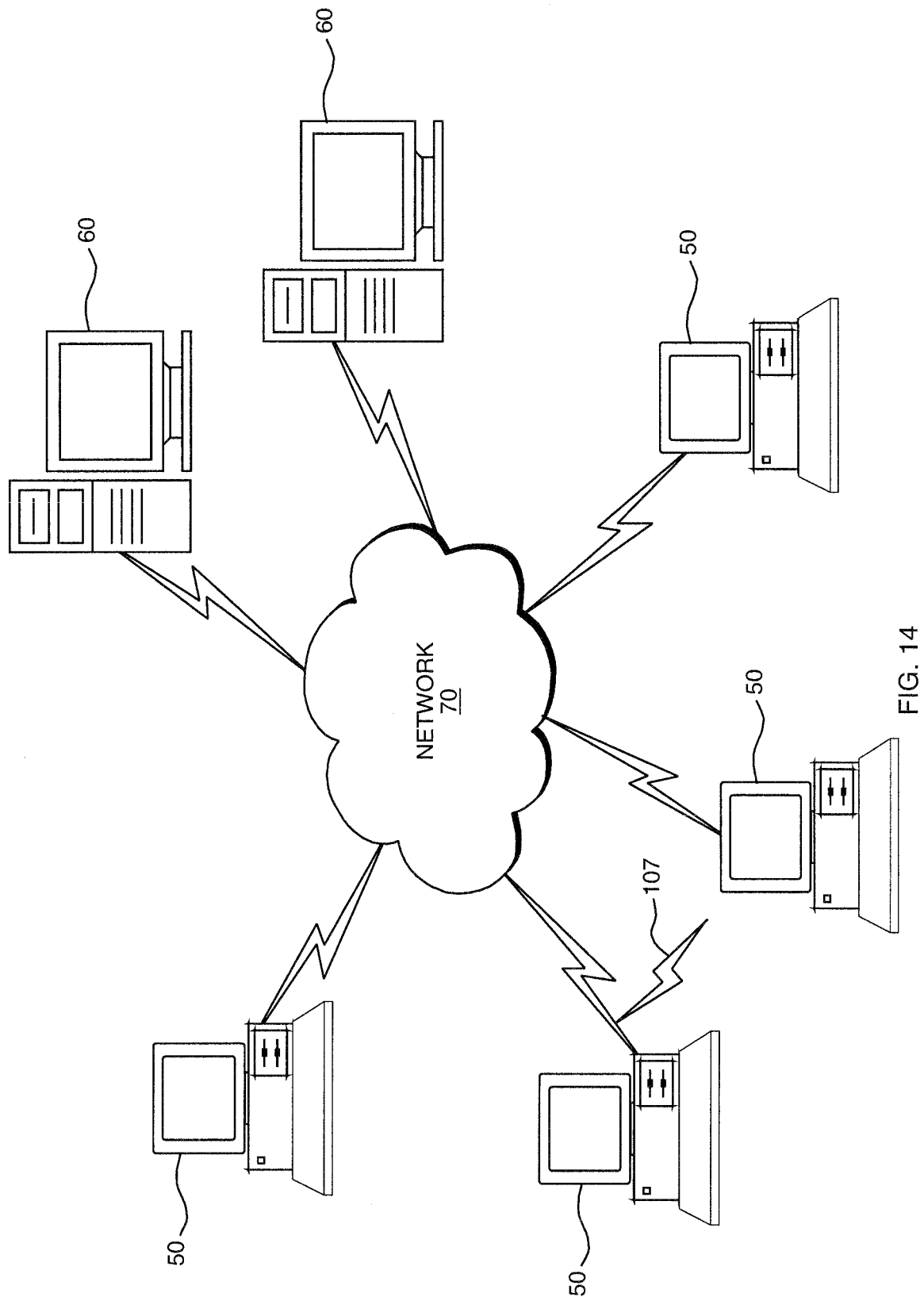
FIG. 14 is a schematic view of a computer network employing an embodiment of the present invention.

FIG. 14 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 15:
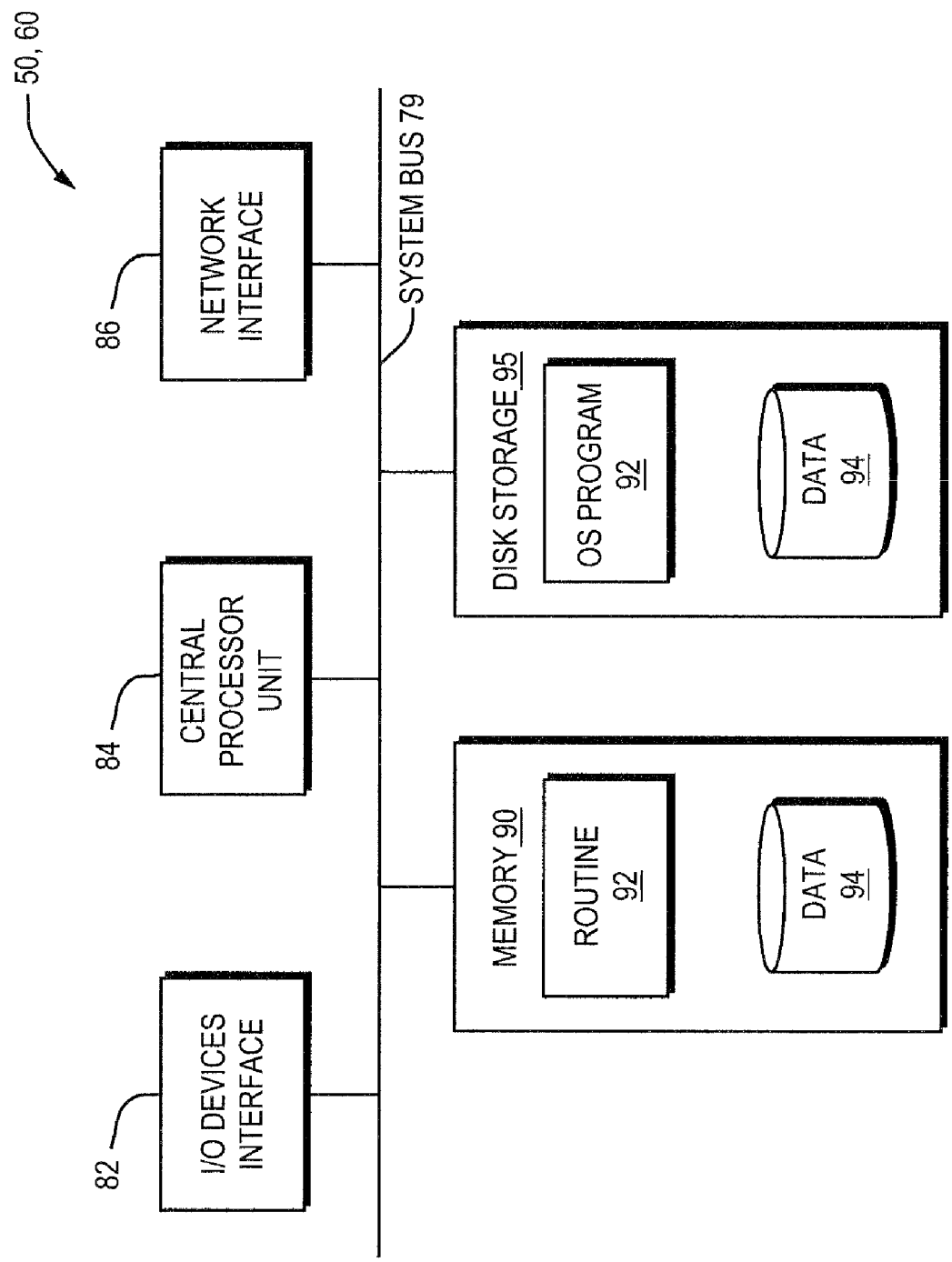
FIG. 15 is a block diagram of a computer node in the network of FIG. 14.

FIG. 15 is a diagram of the internal structure of a computer (e.g., client processor/device 50 or server computers 60) in the computer system of FIG. 14. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 14). Memory 90 provides volatile storage for computer software instructions 92 and data 94 used to implement an embodiment of the present invention (e.g., recommendation engine and processor program 10 detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While the invention has been particularly shown and described with references to example embodiments thereof it will be understood by those skilled in the art that various changes in form and details may be made therein without departing from the scope of the invention encompassed by the appended claims.

For example, computer architecture of FIGS. 14 and 15 are for purposes of illustration and not limitation. Other configurations are suitable. Likewise the term "user" may be the driver or a passenger or a combination in the subject vehicle.

What is claimed is:

1. An in-vehicle computer system, comprising:
a display device configured to present information on a windshield of a motor vehicle; and
a recommendation engine configured to:
receive input identifying a position of the motor vehicle and a change in the position of the motor vehicle;
access demographic data indicating past driving habits including information related to one or more locations, wherein the information related to the one or more locations was previously presented on the display device;
determine a location to recommend in accordance with the past driving habits;
recommend the location that is in proximity with the position of the motor vehicle; and
forward information related to the location to the display device.

2. The system of claim 1, wherein the recommendation engine is further configured to:
determine the location by accumulating the past driving habits; and
recommend the location in accordance with the accumulated past driving habits.

3. The system of claim 1, wherein the recommendation engine is further configured to:
access demographic data comprising past driving habits of a general population; and
determine the location in accordance with the past driving habits of the general population.

4. The system of claim 1, wherein the information related to the location comprises events related to the location.

5. The system of claim 1, further comprising at least one speaker for presenting audio information related to the location.

6. The system of claim 1, wherein the display device is powered by wind power.

7. The system of claim 1, wherein the display device comprises at least one of:
a transparent light-emitting diode (LED) display located at the windshield;
a transparent light-emitting diode screen projected onto the windshield;
a fiber optic lighting display screen embedded in the windshield; or
a fiber optic lighting display screen projected onto the windshield.

8. The system of claim 1, further comprising at least one sensor coupled to the motor vehicle, wherein the at least one sensor is configured to provide operational information related to operation of the motor vehicle to the recommendation engine, and wherein the recommendation engine is configured to determine an alert message associated with the operational information.

9. The system of claim 8, wherein the recommendation engine is further configured to prioritize the operational information and the information related to the location to determine a higher priority message, and wherein the display device is further configured to present the higher priority message on the windshield and to remove a lower priority message.

10. The system of claim 1, wherein the recommendation engine is further configured to wirelessly retrieve the information related to the location from at least one remote database.

11. The system of claim 1, wherein the display device is further configured to present the information related to the location as an advertisement displayed on the windshield.

12. The system of claim 1, wherein the display device is powered by an alternative energy source.

13. The system of claim 1, wherein the recommendation engine is further configured to recommend the location in accordance with both the past driving habits and past spending habits.

14. A method, comprising:
   receiving input from one or more vehicle sensors that identifies in a vehicle position;
   autonomously determining a location that is in proximity to the vehicle position;
   evaluating the location based on past spending habits;
   determining information related to the location in accord with the past spending habits; and
   presenting the information related to the location on a vehicle windshield.

15. The method of claim 14, further comprising accumulating information representing the past spending habits.

16. The method of claim 14, further comprising:
   accessing demographic data on spending habit preferences of a general population, wherein the information related to the location is further determined in accord with the spending habit preferences.

17. The method of claim 14, further comprising:
   presenting text information related to the location on the vehicle windshield; and
   presenting sound information related to the location via one or more speakers.

18. The method of claim 14, wherein presenting the information includes presenting a video on the vehicle windshield.

19. An apparatus, comprising:
   means for receiving input indicating a vehicle position;
   means for identifying a plurality of locations in proximity to the vehicle position;
   means for identifying user preferences based on past spending habits;
   means for comparing the plurality of locations with the user preferences provided in a database;
   means for recommending one or more of the plurality of locations based on the user preferences; and
   means for presenting information related to the recommended one or more locations on a vehicle windshield.

20. The apparatus of claim 19, further comprising:
   means for determining at least one parameter related to vehicle operation; and
   means for presenting the determined at least one parameter related to the vehicle operation on the vehicle windshield.

21. The apparatus of claim 19, further comprising:
   means for identifying the user preferences for a plurality of users, wherein the user preferences are matched to past requests of a vehicle operator.

22. The apparatus of claim 19, further comprising:
   means for identifying the user preferences based on past driving habits.

23. The apparatus of claim 19, further comprising:
   means for determining the user preferences from a general population comprising a plurality of users.

24. The apparatus of claim 19, further comprising:
   means for determining the user preferences from collaborative data based on preferences from a plurality of collaborators.

* * * * *

UNITED STATES PATENT AND TRADEMARK OFFICE
CERTIFICATE OF CORRECTION

PATENT NO. : 7,796,056 B2
APPLICATION NO. : 11/692487
DATED : September 14, 2010
INVENTOR(S) : Fein et al.

It is certified that error appears in the above-identified patent and that said Letters Patent is hereby corrected as shown below:

Column 9, lines 8-9, in Claim 14, delete "identifies in a" and insert -- identifies a --.

Signed and Sealed this
Third Day of April, 2012

David J. Kappos
*Director of the United States Patent and Trademark Office*